(12) United States Patent
Greulich-Weber

(10) Patent No.: US 10,676,364 B2
(45) Date of Patent: Jun. 9, 2020

(54) FIBRE-REINFORCED TRANSPARENT COMPOSITE MATERIAL AND METHOD FOR PRODUCING SAME

(71) Applicant: Universität Paderborn, Paderborn (DE)

(72) Inventor: Siegmund Greulich-Weber, Bad Lippspringe (DE)

(73) Assignee: Universität Paderborn, Paderborn (DE)

( * ) Notice: Subject to any disclaimer, the term of this patent is extended or adjusted under 35 U.S.C. 154(b) by 0 days.

(21) Appl. No.: 15/555,346

(22) PCT Filed: Mar. 1, 2016

(86) PCT No.: PCT/EP2016/054295
§ 371 (c)(1),
(2) Date: Sep. 1, 2017

(87) PCT Pub. No.: WO2016/139195
PCT Pub. Date: Sep. 9, 2016

(65) Prior Publication Data
US 2018/0037462 A1 Feb. 8, 2018

(30) Foreign Application Priority Data

Mar. 2, 2015 (DE) .......................... 10 2015 102 953

(51) Int. Cl.
*C01B 32/956* (2017.01)
*C03C 14/00* (2006.01)
(Continued)

(52) U.S. Cl.
CPC .......... *C01B 32/956* (2017.08); *C03C 14/002* (2013.01); *C08J 5/005* (2013.01);
(Continued)

(58) Field of Classification Search
CPC ..... C01B 32/956; C01B 32/97; C03C 14/002; C03C 14/004; C03C 2214/02;
(Continued)

(56) References Cited

U.S. PATENT DOCUMENTS 4,717,589 A  1/1988  Ishikawa
6,316,051 B2 *  11/2001  Okada .................. C04B 35/573
                                                              427/214

FOREIGN PATENT DOCUMENTS

CN   102502642   *  6/2012
DE   1955683 A1   5/1971
(Continued)

OTHER PUBLICATIONS

Meng G W et al, Formation of SS-SiC Nanorods with Amorphous SiO2 Wrapping Layers, Journal of Materials Science Letters, Aug. 1, 1999, pp. 1255-1257, vol. 18 No. 15, Chapman and Hall LTD., London, GB.
(Continued)

*Primary Examiner* — Camie S Thompson
(74) *Attorney, Agent, or Firm* — Reising Ethington, P.C.

(57) ABSTRACT

The present invention relates to a method for producing a fibre-reinforced, transparent composite material (10), comprising the following steps: a) providing a material matrix melt and b) producing reinforcing fibres (14), step b) of the method comprising the steps of b1) providing a mixture having a silicon source and a carbon source, the silicon source and the carbon source being present together in particles of a granulated solid; b2) treating the mixture provided in step a) of the method at a temperature in a range from ≥1400° C. to ≤2000° C., more particularly in a range from ≥1650° C. to ≤1850° C.; thereby producing reinforcing fibres (14), the method comprising the further steps of c) introducing the reinforcing fibres (14) into the material melt; and d) optionally cooling the material melt to form a
(Continued)

transparent composite material (10). A method of this kind allows a composite material to be produced that is able to unite high transparency with outstanding reinforcing qualities.

15 Claims, 1 Drawing Sheet

(51) Int. Cl.
  *C08J 5/00* (2006.01)
  *C08J 5/04* (2006.01)
(52) U.S. Cl.
  CPC ........... *C08J 5/044* (2013.01); *C03C 2214/02* (2013.01); *C03C 2214/30* (2013.01); *C08J 2333/12* (2013.01)
(58) Field of Classification Search
  CPC ............ C03C 2214/04; C03C 2214/30; C03C 2214/34; C08J 5/005; C08J 5/044; Y10T 428/2918; Y10T 428/2949; B82Y 40/00
  USPC ............. 427/434.6, 443.2, 452, 215, 255.27, 427/297.7; 65/66; 428/367, 384, 284; 264/258, 259
  See application file for complete search history.

(56) References Cited

FOREIGN PATENT DOCUMENTS

EP         2674297 A1    12/2013
WO      2008040333 A2     4/2008

OTHER PUBLICATIONS

S. Greulich-Weber et al, Textile Solar Cells Based on SiC Microwires, Materials Science Forum, Mar. 2, 2009, pp. 239-242, vol. 615-617.
B. Friedel et al, Sol-Gel Silicon Carbide for Photonic Applications, Materials Science Forums, Oct. 15, 2006, pp. 759-762, vol. 527-529.
Meng G W et al, Growth and Characterization of Nanostructured beta-SiC via Carbothermal Reduction of SiO2 Xerogels Containing Carbon Nanoparticles, Journal of Crystal Growth, Feb. 1, 2000, pp. 801-806, Amsterdam, NL.
International Search Report for PCT/EP2016/054295 dated May 30, 2016, 4 pages.
English Translation of the International Search Report for PCT/EP2016/054295 dated May 30, 2016, 3 pages.
Notification of Transmittal of Translation of the International Preliminary Report on Patentability for International Application No. PCT/EP2016/054295; dated Sep. 21, 2017; 9 pages.

* cited by examiner

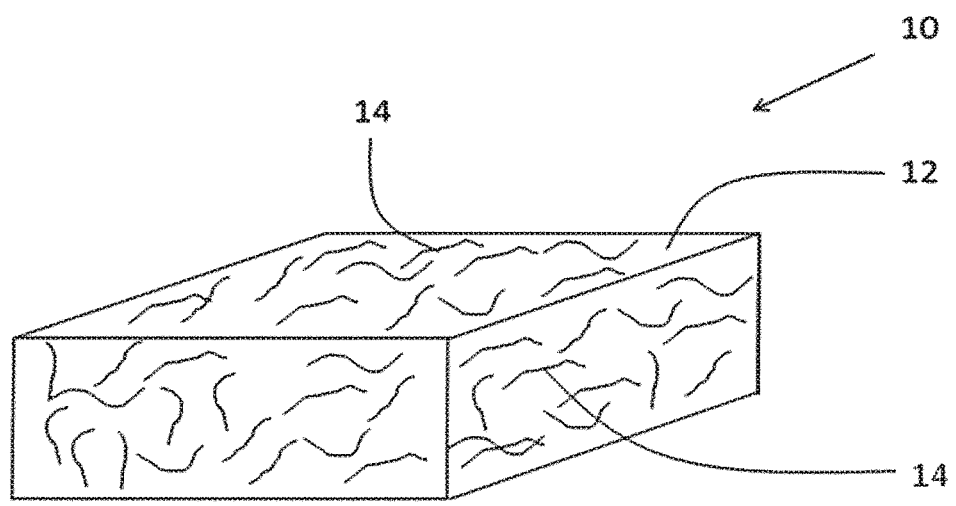

FIBRE-REINFORCED TRANSPARENT COMPOSITE MATERIAL AND METHOD FOR PRODUCING SAME

The present disclosure relates to a method for producing a fiber-reinforced composite material and for producing a fiber-reinforced component part. The present disclosure further relates to a fiber-reinforced composite material and a fiber-reinforced component part, wherein the fibrous material displays a high level of transparency.

It is known to use fiber-reinforced materials in order, for instance, to obtain some structural reinforcement and thereby improve the stability of various component parts. This can be problematic with transparent substances in particular, since the transparency may be adversely affected by the reinforcing fibers. This has hitherto hindered or prevented, for example, any use of silicon carbide fibers for fiber reinforcement of transparent materials, since still adherent carbon from the manufacturing process of the fibers may often dull the transparency.

It is, for example, known from EP 0 095 433 to provide structural reinforcement to a glass fiber ceramic through silicon carbide fibers. The ceramics in question are produced by reacting the silicon carbide fibers with certain metal ions in order that a diffusion protection layer may thereby be formed on the surface of the silicon carbide fibers. This document, however, is not geared to transparent substances, but dyes are stated to be admixed. A process for producing transparent silicon carbide fibers is not disclosed in this document.

Document EP 2 674 297 A1 further describes a fiber for a composite article. A fiber of this type includes a fiber body and a matrix ply in the form of a coating thereon. Although describing that composite articles of this type may have substantially transparent properties as well as non-transparent applications, completely transparent fibers are not described, and therefore the transparency of such conventional fibers still offers room for improvement. The production of the fibers especially in a highly transparent state is not described in this document either.

Known form document EP 0 453 704 A2 is further to reinforce glass or glass-ceramic composite materials by the application of fibers. Silicon nitride fibers are used as reinforcing fibers in this document. They are stated to be substituted for conventional silicon carbide fibers.

Document U.S. Pat. No. 4,485,179 further describes a glass ceramic reinforced with silicon carbide fibers. The reinforcing fibers react with tantalum or niobium components to create a diffusion barrier around the fibers. This document is also not geared to transparent substances. A process for producing transparent silicon carbide fibers is not disclosed in this document.

Document U.S. Pat. No. 4,755,489 further describes glass-ceramic materials fiber reinforced by silicon carbide fibers. This document is also not geared to transparent substances. A process for producing transparent silicon carbide fibers is not disclosed in this document.

Document U.S. Pat. No. 4,460,639 further describes glass-ceramic substances fiber reinforced by silicon carbide fibers. The reinforcing fibers are impregnated therein with a resin. This document is also not geared to transparent substances. A process for producing transparent silicon carbide fibers is not disclosed in this document, instead, commercially available fibers are used.

The document "The Generation of Multiple Matrix Cracking and Fibre-Matrix Interfacial Debonding in a Glas Composite, Y. Sun et al., Acta mater. Vol. 46, No. 5, pages 1657-1667, 1998 describes investigations regarding the breakage behavior of fiber-reinforced ceramics. They comprise silicon carbide fibers in a transparent glass ceramic, the silicon carbide fibers having a carbon core supporting a silicon carbide deposit. These fibers therefore do not appear to be transparent, nor are they purely silicon carbide.

Although the use of silicon carbide as reinforcing fibers is thus in principle described previously, none of the aforementioned documents discloses any production of highly transparent silicon carbide fibers. The focus with the aforementioned documents is in principle not on the production of the silicon carbide fibers, but especially on their employment and further processing.

There thus continues to be room for improvement in the production of transparent reinforcing fibers for transparent matrix substances. More particularly, there is further room for improvement with regard to the transparency of the reinforcing fibers.

It is an object of the present disclosure to provide a solution whereby reinforcing fibers are obtainable in an inexpensive manner that combine good transparency with good mechanical properties.

The object is solved according to one embodiment of the disclosure by a method for producing a fiber-reinforced transparent composite material, having the features of claim 1. The object is further solved by a method for producing a transparent component part having the features of claim 7. The object is further solved by a composite material having the features of claim 8 and a component part having the features of claim 13. The problem is further solved by a use according to claim 15. Preferred embodiments of the disclosure are disclosed in the dependent claims, in the description, in the FIGURE and the example, wherein further features shown or described in the dependent claims or in the description or in the FIGURE or in the example may singly or in any desired combination constitute a subject of the invention unless the contrary is unambiguously apparent from the context.

There is proposed a method for producing a fiber-reinforced transparent composite material, said method comprising the steps of:

a) providing an material matrix melt; and
b) producing reinforcing fibers, wherein step b) comprises the steps of:
b1) providing a mixture comprising a silicon source and a carbon source, wherein the silicon source and the carbon source are conjointly present in particles of a granular solid;
b2) treating the mixture provided in step b1) with a temperature in a range of ≥1400° C. to ≤2000° C., especially in a range of ≥1650° C. to ≤1850° C.; to produce reinforcing fibers wherein the method includes the further steps of:
c) importing the reinforcing fibers into the material melt; and
d) optionally cooling the material melt to form a transparent composite material.

A method as described above provides a fiber-reinforced composite material which in respect of its transparency offers significant advantages over prior art solutions.

In this context, the following method in its entirety or steps a) to d) and especially b) may proceed with preference under protective gas, especially argon.

The method described above thus serves to provide a composite material comprising a transparent matrix structurally reinforced by incorporation of reinforcing fibers. The substance of the matrix material and/or of the composite material may be transparent in the solid state only, or the melt may also be in a transparent state.

A composite material, also referred to as composite engineering material, or compound material, respectively, herein is to be understood in a conventional manner as meaning an material comprising two or more interbonded substances and possessing material properties not possessed by its individual components. Due to the embedment of the fibers in the matrix, especially a fiber-reinforced composite material is present as a composite material.

A transparent matrix is further to be understood as meaning a matrix where light, especially light in the visible region, shining through is merely reflected at the surface but not or at least not significantly in the interior. The transmission losses due to the matrix and the reinforcing fibers should be kept low, being for instance in a range of ≤10%, especially ≤5%, for example in the range of ≥1% to ≤10%, especially in a range of ≥3% to ≤5%, subject to the proviso that the above relates specifically to light in the visible region, i.e., to light having a wavelength of 390 nm to 790 nm.

A material is further to be understood as meaning specifically a usually shapeless base material for forming shaped component parts further processed out of the material which may each then be an end product.

The method described above includes at first according to process step a) the provision of a material matrix melt. This material matrix melt has been formed specifically of a substance which is to form the transparent matrix. The matrix substance for this may in principle be freely chosen provided it is configurable as a melt in temperatures suitable for the subsequent process. The substance should further display adequate transparency in the solid state at least.

The method comprises according to process step b) the production of reinforcing fibers. According to the method described above, the purpose is especially to produce such reinforcing fibers which have a high level of transparency. Due to this, it becomes possible that the transparency of the matrix material is not reduced, or at least not reduced significantly, by the act of incorporating the reinforcing fibers.

To accomplish this, it is specifically single-crystalline fibers of nanostructured silicon carbide which are produced in the method described above, and the fibers may take the form of 3C—SiC in particular. These fibers, especially when produced in a process detailed hereinafter, surprisingly make possible a particularly high level of transparency, while the transparency is further improvable especially over traditional, usually amorphous, silicon carbide fibers.

With this regard, the method of producing the reinforcing fibers comprises especially following process steps.

The method first comprises a step b1) of providing a mixture comprising a silicon source and a carbon source, wherein the silicon source and the carbon source are conjointly present in particles of a granular solid. It may thus be preferable in particular that every particle of the granular solid includes a carbon source and a silicon source. The silicon source and the carbon source have the purpose to synthesize silicon carbide later in the process, by a reaction of the carbon source with the silicon source. For that reason, the silicon source and the carbon source should be chosen such that they are able to form silicon carbide under the hereinafter described conditions, especially at the following temperatures, for instance at atmospheric pressure (1 bar), by the method described above.

In particular, the silicon source in the solid may be pure silicon or silicon dioxide, while the carbon source in the solid may be pure carbon, in which case the particles of the solid may be formed, for example, by a sol-gel process as detailed hereinafter. For example, the particles of the solid may consist of silicon, carbon and optionally one or more dopants, as described hereinafter, or at least comprise the largest portion, for instance in a range of ≥90 wt %.

According to step b2) the method further comprises the step of treating the mixture provided in step b1) with a temperature in a range of ≥1400° C. to ≤2000° C., especially ≥1600° C., for example in a range of ≥1650° C. to ≤1850° C., especially in a reactor. This step enables the formation of silicon carbide from the carbon source and from the silicon source of the granular solid.

Dependent on the chosen temperature, it is possible to control the specific form of the formed silicon carbide. In detail, a temperature setting in step b2) to a range of about ≥1650° C. to about ≤1700° C. at atmospheric pressure (1 bar) makes for a particularly advantageous way to form nanostructured fibers of silicon carbide. In fact, it may be advantageous to establish a temperature gradient, so the substance of the granular solid is able to transition into the gas phase at a position having a comparatively higher temperature and silicon carbide fibers are able to deposit at the comparatively lower temperature, as for instance on a deposition surface. There thus may be provided, especially in order to synthesize fibrous silicon carbide, a deposition surface which, compared to the aforementioned temperature, has a reduced temperature. For example, the temperature of the deposition surface may be reduced by a temperature in a range of ≥50° C. to ≤100° C., as compared with the in-principle reactor temperature setting in the aforementioned range of ≥1400° C. to ≤2000° C., especially ≥1600° C., for example in a range of ≥1650° C. to ≤1850° C., especially in a range of about ≥1650° C. to about ≤1700° C. Especially fibrous silicon carbide has the advantage that it may serve as reinforcing fibers and thus be ideally imported into a matrix in order that a reinforcing effect may thus be created.

Fibers may be particularly constructs where the ratio of length to diameter is equal or more than 3:1, whereas with particles, in delimitation from fibers, the ratio of length to diameter is less than 3:1. In the present application, for example, the length-to-diameter ratio of fibers may also be equal or more than 10:1, especially equal or more than 100:1, for example equal or more than 1000:1.

Following the step of producing the silicon carbide fibers, the method described above may further include a step c) of importing the reinforcing fibers into the material melt. This may in principle be accomplished in a conventional manner, for instance via suitable introsprinkling devices and/or suitable mixing devices.

A concentration of reinforcing fibers may thereby be chosen dependent on the desired application of the composite material also referred to as fiber-reinforced composite material. Illustratively and by no means limitingly, the reinforcing fibers may be present in the matrix in an amount ranging from ≥2% by volume to ≤60% by volume, especially from ≥2% by volume to ≤20% by volume. The aforementioned ranges and/or the value within the ranges may be dependent on the thickness and the length of the reinforcing fibers.

After this method step, the material may be in an already finalized state, for instance that of a melt. In this case, the material may be further processed directly from the melt into a desired component part.

Optionally, if necessary according to process step d) a cooling of the material melt down to form a transparent solid may be realized which then constitutes the composite material. Any cooling therein should be carried out such that the solid thus obtained becomes transparent. This may e.g. be realizable, for example, via a defined rate of cooling, as a person skilled in the art is sufficiently familiar with regarding glass or plastics. The conditions for a cooling are thus particularly adjustable according to the choice of matrix material.

Especially in the case of glass as matrix substance, the advantage of silicon carbide becomes manifest because here there is high transparency and the fibers are stable at up to high temperatures, so they are also straightforward to import into a glass melt.

Especially the above-described production of reinforcing fibers makes possible the formation of particularly preferred reinforcing fibers with regard to transparent composite materials.

With the fiber formation described above there may be an advantage in the intimate mixture, for instance at atomic level, of silicon and carbon in the granular solid resulting in the possible presence of $Si_2C$ and $SiC_2$ even in the gas phase, because this leads to easier formation of SiC elsewhere in the temperature gradient. So an Si—C gas may be present directly, although as will be readily understood by a person skilled in the art other gaseous components may also be present.

The temperature setting may further enable the silicon carbide obtained in the form of fibers to be a single crystal and in that state nanocrystalline and specifically to enable a cubic 3C structure for the silicon carbide. Especially when the silicon carbide (SiC) is present as a silicon carbide single crystal, preferably as monocrystalline cubic 3C—SIC, the single crystal silicon carbide fibers are united by a high thermal conductivity, as may be advantageous for certain applications, as detailed hereafter, and also a chemical and thermal durability, as is advantageous for long-term stability, with good structurally reinforcing properties. Hexagonal forms of the silicon carbide, however, are also conceivable in the context of the present invention.

The nanoscaleness of the silicon carbide fibers obtained may be an important point in the method described above. A nanostructured silicon carbide in this context may be understood as meaning in particular a silicon carbide which in at least one dimension has a maximal spatial extent in the nanometer region, especially at equal or less than 100 nm, where the lower limit may be limited by the method of production. More particularly, the lower limit with the fibers may be determined by the temperature at the growth locus, the established temperature gradient and the time for growing the fibers.

The method described above is further advantageous because the silicon carbide obtained is in its as-produced state directly suitable for the above-described application as reinforcing fibers. Because the silicon carbide is therefore directly obtainable directly before composite substance production and further readily available, any formation of a silicon oxide layer ($SiO_2$) on the surface of the silicon carbide can be prevented. Oxidation processes thus do not result in the formation of any material that might reduce the transparency of the composite substance. Its intentional removal is precisely not necessary by virtue of an immediate utility. Such an additional step is precisely eschewable in the present disclosure, which can make the method particularly cost-effective.

Compared with the reinforcing fibers obtained according to the disclosure, traditional, for instance amorphous, SiC fibers usually possess only a limited degree of purity, for instance residues of carbon. The method described above, by contrast, makes the production of very pure silicon carbide fibers possible, which may further enhance the transparency of the composite substance.

Silicon carbide fibers in principle offer the advantage of high robustness and resistance to a multiplicity of chemicals and conditions and are further also stable at high temperatures of up to, for example, 2400° C.

As a result of the fibers produced in any method described above being crystalline in particular, the properties with respect to stability and inertness toward chemicals and conditions are further improved.

In summary, therefore, the method described above provides a way to combine a simple and cost-effective process for producing the composite material at a high level of transparency and a good stabilization.

An embodiment of the method described above may provide that the mixture provided in step b1) is provided by using a sol-gel process. A sol-gel process herein is to be understood in a conventional manner as meaning such a process wherein starting materials of the compound to be produced, which are known as precursors, are present in a solvent, this mixture being termed a sol. In the course of the process, drying/aging results in the development of a so-called gel wherefrom by further treatment, especially a thermal treatment, a solid may arise. This solid may thus be defined via the selection of the precursors and contains the carbon source and the silicon source for the silicon carbide formation and may optionally further contain a dopant for doping the silicon carbide, the admixture of which dopant may take place even as the sol is being prepared.

This sol-gel process may likewise proceed wholly or at least partly in a protective atmosphere, as particularly in an argon atmosphere.

Especially an embodiment of the above-described method featuring a sol-gel process may provide that the sol-gel process comprises at least the steps of:
e) providing a precursor mixture with a silicon precursor, a carbon precursor and optionally a dopant, wherein the precursor mixture is present in a solvent;
f) treating the precursor mixture at elevated temperature especially with respect to room temperature (22° C.) to dry the precursor mixture; and
g) optionally heating the dried precursor mixture to a temperature in a range of ≥800° C. to ≤1200° C., especially in a range of ≥900° C. to ≤1100° C.

According to method step e), thus, initially the precursors may be provided which are processed into a solid and may then serve as carbon source and, respectively, as silicon source which are respectively provided and used in method step b1). The choice of silicon source and of carbon source and respectively of the silicon precursor and the carbon precursor is thus not restricted in principle. Preferred silicon precursors may include, for example, silicates, for instance tetraethyl orthosilicate (TEOS), whereas preferred carbon precursors may include sugar, for instance saccharose, in order to form the solid particles which are respectively provided and used as carbon source and silicon source in method step b1). There may for example be provided a mixture of liquid sugar and tetraethyl orthosilicate dissolved in ethanol as a mixture of carbon precursor and silicon precursor in method step e), although the disclosure as will be readily understood is not limited to the aforementioned examples.

This mixture may be made to gel/age in the absence of air as per method step f), for example in a temperature range close to the boiling point of the solvent, with the use of ethanol for instance in a range of 60-70° C., and may further be dried at a temperature above the boiling point. It may be advantageous here for the step of drying the solid to give rise to particles having a maximum diameter in a range of about ≥1 μm to ≤2 mm, although, as already indicated above, particles in a size range of >10 μm to ≤2 mm are particularly preferable for nanocrystalline silicon carbide fibers. The aforementioned size ranges have specifically advantages regarding the process, as for instance putting a stop to the ascent of finer particles in a fiber production. Such a particle size may be made possible for example by a stirring process during drying, in which case the particle size may for instance be adjustable via the stirrer used, a peripheral speed of the stirrer and the duration and/or intensity of stirring, as is in-principle knowledge of a person skilled in the art.

Method step g) is a subsequent optional step of heating the dried precursor mixture to a temperature in a range of ≥800° C. to ≤1200° C., especially in a range of ≥900° C. to ≤1100° C., for example at 1000° C. This method step may be used to specifically rid the produced solid of impurities, so the silicon carbide obtained may be made particularly pure. As a result, the quality of a reinforcing fiber produced and hence its transparency may be particularly high. In addition, any crystallization of the silicon carbide out of the gas phase may be improved thereby.

Method steps f) and optionally g) respectively provide and finalize the mixture of method step b1), while the sol-gel process described above may give rise to particles which may each contain a silicon source, for example pure silicon or silicon dioxide, and a carbon source, for instance pure carbon. A dopant added during the sol-gel process may also end up being included in these particles, as detailed hereafter. Therefore, the sol-gel process is capable of providing a mixture at a virtually atomic level, thereby greatly simplifying the production of silicon carbide.

In summary, therefore, an embodiment may involve the practice of a sol-gel method wherein the substances to be processed combine to form a mixture in the form of a gel and are subsequently dried, and in a further step, involving a carbothermal reduction, the step of crystallizing out the silicon carbide, as for instance the step of growing the fibers, proceeds. The sol-gel process, known per se as a process, offers an efficiently manageable and widely adjustable way to produce various starting substances for producing the fibrous substance according to the disclosure or the precursor substances therefor.

One possible way to influence the properties of a specifically fiber-reinforced composite material arises when the fibers formed are crosslinked with each other in the course of an aftertreatment in a renewed sol-gel method. The individual fibers, by virtue of being crosslinked in the region of contacting points between single or a multiplicity of fibers, are formed thereby into a firm yet flexible bonded assembly of fibers without textile processing steps being needed to bond the fibers together.

A further embodiment of the method may provide that step b2) proceeds in a reactor having a deposition surface whose temperature is reduced relative to at least one further inner reactor surface. Especially this embodiment provides a particularly simple way—not in need of high capital expenditure—to deposit silicon carbide from the gas phase in the desired manner, especially as fibers, by providing a temperature gradient. This is because contact with the deposition surface makes it possible for silicon carbide to deposit from the gas phase directly without any further means being required. For example, the reactor may be embodied as an, for example, upwardly open vessel, for instance as an upwardly open cylinder, in which the precursors are heated to the above-described temperature. Above the opening, directed upwardly for example, the deposition surface, which may for example be circular and for instance rotatable, may be disposed, for instance in the interior of the vessel, or be oriented theretoward, so the gas phase can come into contact with the deposition surface, as a result of which the silicon carbide may deposit here, for example in the form of nanoscale fibers.

Especially with regard to the step described above, it may be advantageous, depending on the form desired for the silicon carbide to be produced, to establish, for example in a drying step during the sol-gel process, say by a stirring operation, a suitable particle size for the solid, as described above with reference to method step g). It may be preferable for example to obtain a particle size in a range of >10 μm to ≤2 mm, for example in a range of ≥25 μm to ≤70 μm, in order to produce silicon carbide fibers.

It may thereby be provided that the deposition surface has a temperature which relative to at least one further inner reactor surface has a temperature which is reduced by an amount in the range of ≥30° C. to ≤200° C., especially in a range of ≥50° C. to ≤100° C. In this embodiment, the deposition specifically of silicon carbide fibers may proceed particularly effectively, while a temperature difference of this type is further a technically simple matter to establish.

A further embodiment may provide that the reinforcing fibers in the material melt or before being imported into the material melt are treated with a temperature in a range of ≥2100° C. The reinforcing fibers may for example be treated with a temperature whose upper temperature is limited by the stability properties of the fibers, which may decompose at about 2700° C., or of the matrix substance. A particularly advantageous temperature is in the range of ≥2100° C. to ≤2400° C. Such a thermal treatment may cause the silicon carbide, present as 3C—SiC for instance, to particularly recrystallize irreversibly into silicon carbide of the form 6H—SiC. Especially silicon carbide in the form of 6H—SiC may be very transparent in the ultraviolet spectrum also, in which case the corresponding transparency in the UV region in particular may be significantly higher than that of 3C—SiC.

A further embodiment may provide that the reinforcing fibers are subjected to doping. This is possible by importing a desired dopant into the fibers in order that some electrical conductivity may thereby be made possible.

Method step b1) may be used to provide, illustratively but by no means limitingly, a mixture comprising a silicon source, a carbon source and a dopant, wherein the silicon source, the carbon source and the dopant are conjointly present in particles of a granular solid. The dopant may be selected on the basis of the desired dopancy. The dopant or the dopants may for this be added in an in principle freely chooseable form, say admixed as a soluble compound in a manufacturing process of the granular solid, or say elementally, for example metallically. So the dopant may likewise be a constituent part of the granular solid recited in method step b1). Alternatively, however, it is also conceivable for the nascent silicon carbide, say as nascent fibers of 6H or 3C silicon carbide nanocrystals to be doped during the thermal treatment via the gas phase, as detailed hereafter. Useful doping substances include preferably phosphorus (P) or nitrogen (N) for an n-dopancy or boron (B) or aluminum (Al) for a p-dopancy. Doping establishes particularly good electrical conductivity for the reinforcing fibers in addition to a reinforcing function.

Where, furthermore, the dopant is not present in the granular solid comprising the carbon source and the silicon source and the granular solid is transferred in the course of method step a) into the reactor in which the thermal treatment of method step b2) takes place, the dopant may be introduced into the reactor as a gas, for instance, in which case the mixture of method step b2) can form directly in the reactor before the thermal treatment. This may be especially advantageous when the dopant is able to take the form of a gas. Gaseous nitrogen may serve as dopant in this case, for example.

The doping substances are advantageously imported in the wet-chemical part of the sol-gel synthesis, as a result of which the doping substances become incorporated into the growing fibers or the particles during the thermal treatment. The doping substances may for this either be admixed as a soluble compound or added metallically. Alternatively, however, it is also conceivable for the nascent fibers to be doped during the thermal treatment via the gas phase. Useful doping substances again include preferably phosphorus (P) or nitrogen (N) in the one case and boron (B) or aluminum (Al) in the other.

Especially the addition of a dopant may enable the silicon carbide fibers to display an extremely good electrical conductivity. This may extend yet further the field of use for the composite material obtained and/or for the component parts obtained therefrom. Component parts are specifically obtainable in this manner to have good electrical conductivity as well as good stability. Especially in this embodiment, the disclosure may similarly include the option that the focus of the component parts obtained is not necessarily on their reinforcement, but rather on their electrical conductivity. By virtue of providing the fibers in the matrix material, however, it is nonetheless a fiber-reinforced composite material which is concerned.

Examples of component parts obtainable via a composite material in this embodiment include, for instance, transparent microwave-protective glass, for example for domestic microwaves, transparent microwave-receiving antennas of transparent plastic or glass as matrix, vehicle panes, say heatable or with a receiving antenna or to form an improved Faraday cage, touch displays or transparent electrodes.

When the fibers are supposed to be aligned in the matrix for the purposes of achieving a conductivity structure, this is realizable through electrostatic effects for example.

Regarding further advantages and technical features of the above-described method for producing a composite material, explicit reference is hereby made to the description of the method for producing a component part, the composite material, the component part, the use and also the FIGURE and the example, and vice versa.

The present disclosure further provides a method for producing a transparent component part, wherein said method comprises a method for producing a transparent composite material as detailed above, and wherein the produced composite material is further processed into a component part. This method step thus has the particular purpose to form a ready-produced component part out of the composite material.

The step of further processing may be effected, for example, by the material being, by cutting for instance, brought into a suitable shape and/or imported into a suitable periphery. Further processing may further in principle comprehend any suitable step capable of finalizing the component part in a manner known per se to a person skilled in the art, for instance the step of providing suitable structures, electrical connections or the like. This, as will be readily understood by a person skilled in the art, is dependent on the component part specifically formed.

Regarding further advantages and technical features of the above-described method for producing a component part, explicit reference is hereby made to the description of the method for producing a composite material, the composite material, the component part, the use and also the FIGURE and the example, and vice versa.

The present disclosure further provides a fiber-reinforced composite material comprising a transparent matrix comprising reinforcing fibers, wherein the composite material is obtained by a method as detailed above. A composite material of this type provides in particular that the reinforcing fibers comprise single crystal silicon carbide.

A composite material of this type has the particular advantage of possessing a particularly high level of stability. In effect, the very good stability properties of the silicon carbide are combinable in a particularly advantageous manner with a high level of transparency for the fibers and hence for the composite material as a whole. A composite material as described above, especially one comprising single crystal silicon carbide, say in the form of 3C—SiC or 6H—SiC, is thus capable of enabling in particular the creation of a highly transparent material free from prior art disadvantages regarding a reduced transparency of the reinforcing fibers.

In addition, the reinforcing fibers of the composite material are particularly simple, by doping fibers, to endow such that they have a high electrical conductivity. As a result, the field of use for the composite material may be very diverse and also permit applications demanding some electrical conductivity on the part of the fibers.

The aforementioned advantages are specifically obtainable when the composite material is obtained by a method configured and developed as detailed above.

It may further be preferable for the reinforcing fibers to have a length of a plurality of millimeters and a thickness in the nanometer region to the micrometer region. It may be provided in particular that the reinforcing fibers have a length in a range of $\geq 5$ mm to $\leq 20$ mm. It may additionally or alternatively be provided that the reinforcing fibers have a thickness in a range of $\geq 0.1$ µm to $\leq 2$ µm. It was determined that especially reinforcing fibers having the above-described properties have particularly pronounced reinforcing properties as comparatively short fibers. Especially fibers having the aforementioned parameters may thus have particularly high stability properties.

It may further be preferable that the matrix material is selected from the group consisting of glass and plastic. Especially the aforementioned substances may have a high level of transparency, so it is especially with these substances that highly transparent reinforcing fibers may be advantageous.

A further embodiment may provide that the reinforcing fibers are electrically conductive. Especially the provision of electrically conductive reinforcing fibers makes it possible to further improve the field of use for the composite material to also include applications of electrically conductive and simultaneously highly transparent substances. Illustratively and by no means limitingly, the electrically conductive fibers may have a conductivity of 0.0005 $\Omega^{-1}$ cm$^{-1}$ to $\leq 1$ $\Omega^{-1}$cm$^{-1}$, for example $\geq 0.005$ $\Omega^{-1}$cm$^{-1}$ to $\leq 0.2$ $\Omega^{-1}$cm$^{-1}$.

Regarding further advantages and technical features of the above-described composite material, explicit reference is hereby made to the description of the above-described method, the component part, the use and also the FIGURE and the example, and vice versa.

The present disclosure further provides a fiber-reinforced component part wherein the component part is formed out of a composite material configured and developed as detailed above.

A component part of this type has the particular advantage of having a particularly high level of stability by virtue of the composite material used. In effect, the very good stability properties of the silicon carbide may be particularly advantageously combined with a high level of transparency on the part of the reinforcing fibers and hence on the part of the entire component part and/or the component produced out of the composite material. An above-described component part, especially comprising single crystal silicon carbide, say in the form of 3C—SiC or 6H—SiC, as reinforcing fibers is able to be highly transparent and hence free of prior art disadvantages regarding a reduced level of transparency on the part of the reinforcing fibers.

The component part may for example be selected from the group consisting of a transparent microwave-protective glass, for example for domestic microwaves, transparent microwave-receiving antennas of transparent plastic or glass as matrix, vehicle panes, say heatable or with a receiving antenna or to form an improved Faraday cage, touch displays or transparent electrodes, or generally fiber-reinforced glass or fiber-reinforced plastic.

Regarding further advantages and technical features of the above-described component part, explicit reference is hereby made to the description of the composite material, the method, the use and also the FIGURE and the example, and vice versa.

The present disclosure further provides using a method as detailed above for producing a fiber-reinforced composite material or for producing a fiber-reinforced component part.

The above-described use makes possible in particular the use of highly transparent reinforcing fibers which by virtue of excellent reinforcing properties make possible a very stable and highly transparent composite material and/or a very stable component part having a very wide field of use.

Regarding further advantages and technical features of the above-described use explicit reference is hereby made to the description of the composite material, the method, the component part and also the FIGURE and the example, and vice versa.

An embodiment of the disclosure will now be described by way of example with reference to a FIGURE, while the features represented hereafter may represent an aspect of the disclosure not only each singly but also in combination, and while the disclosure is not limited to the example hereinbelow.

FIG. 1 shows an embodiment of a composite material in accordance with the present disclosure.

A composite material 10 is shown in FIG. 1. Such a composite material 10 comprises a transparent matrix 12 which may be formed for instance of glass or a plastic, for example polymethyl methacrylate (PMMA, Plexiglas). The transparent matrix 12 accommodates reinforcing fibers 14. The reinforcing fibers 14 are importable into the matrix 12 by, for example, melting the substance of the matrix 12 and distributing the reinforcing fibers 14 therein. These reinforcing fibers 14 are especially silicon carbide fibers formed of single crystal 3C—SiC or 6H—SiC.

An exemplary process for producing such reinforcing fibers 14 is described in the following embodiment.

EMBODIMENT

The example described hereinafter relates to the production of silicon carbide as reinforcing fibers 14 for producing a transparent composite material 10 by using a sol-gel process.

The manufacturing process for nanocrystalline SiC fibers by using a sol-gel process will now be described first.

Production of sol-gel Si—C precursor: the chemical composition, sol-gel preparation with various drying steps at 70° C. to 200° C. and also final derivation of the granular Si—C solid at 1000° C. is described in what follows.

Liquid sugar, tetraethyl orthosilicate and ethanol are mixed together into a sol and the sol is made to gel at 60-70° C. in the absence of air. The composition for the batch was (a) a colloidal suspension of 135 g of tetraethyl orthosilicate (TEOS) dissolved in 168.7 g of ethanol as silicon source and (b) a solution of 68 g of sucrose as carbon source, in 75 g of distilled water whereto are added 37.15 g of hydrochloric acid (HCl) as catalyst to form invert sugar. Then, solution (a) was mixed together with liquid sugar (b) under agitation by stirring. Alternatively, liquid sugar (invert sugar, 122 g of 70% strength) can also be used directly instead of solution (b). In that case, no water is added and but very little hydrochloric acid (5.2 g), since the latter is now only needed to start the gelling process. This sol is aged at 50° C. and subsequently dried at 150-200° C.

The production of SiC fibers requires preferably coarser granules (some 10 μm), so temporary stirring is performed during aging and/or drying. This granular or pulverulent material is freed of remaining unwanted reaction products at 1000° C. in a nitrogen or argon gas stream and finally ground if necessary.

The SiC precursor may then be modified for the purpose of doping SiC nanofibers and SiC nanopowders. n-Doping may be effected for instance with nitrogen (exemplary additives: nitric acid, ammonium chloride, potassium nitrate or melamine), or with phosphorus (exemplary additives: potassium dihydrogenphosphate or disodium hydrogenphosphate). p-Doping may be effected for example with boron (exemplary additives: disodium tetraborate) or with aluminum (additive: aluminum powder). The dopants are admixed to the sol, the amounts being dependent on the specific additive and the desired level of dopancy.

For silicon carbide fiber production, the resultant solid is heated in a high-temperature reactor wherein the granules transition into the gas phase at from 1400° C., especially at from 1600° C., and single crystal silicon carbide fibers deposit in a temperature gradient on a rotating substrate. Preferred fibers grow at from 1650° C. to 1700° C. in the gas phase and/or on an approximately 50-100° C. cooler deposition surface.

Surface modification may optionally involve effecting an increase in the surface conductivity in order to make a particularly high conductivity of the 3C—SiC, next to a bulk dopancy effected as described above during the SiC production. The production of the ultrapure nanofibers may be carried out in an inert atmosphere. All subsequent manufacturing steps, such as for instance the step of embedding into a matrix, may then be carried out within a few hours or completely in the absence of oxygen in order that any oxidation of the surface may be prevented.

The fibers thus described are importable into a melt of a transparent matrix material. For this, it is possible to use, for example, a sprinkling device known per se and to stir the melt of the matrix substance. After the fibers have been embedded in the matrix, the melt may solidify by cooling down.

The invention claimed is:

1. A method for producing a fiber-reinforced transparent composite material, said method comprising the steps of:
   a) providing a material matrix melt; and b) producing reinforcing fibers, wherein step b) comprises the steps of:
  b1) providing a mixture with a silicon source and a carbon source, wherein the silicon source and the carbon source are conjointly present in particles of a granular solid; and
  b2) treating the mixture provided in step b1) with a temperature in a range of ≥1400° C. to ≤2000° C. to produce reinforcing fibers;
c) importing the reinforcing fibers into the material melt; and
d) optionally cooling the material melt to form a transparent composite material;
wherein step b2) proceeds in a reactor having a deposition surface whose temperature is reduced relative to at least one further inner reactor surface by an amount in the range of ≥30° C. to ≤200° C.

2. The method as claimed in claim 1, wherein the mixture provided in step b1) is provided by using a sol-gel process.

3. The method as claimed in claim 2, wherein the sol-gel process comprises at least the steps of:
  e) providing a precursor mixture with a silicon precursor, a carbon precursor and optionally a dopant, wherein the precursor mixture is present in a solvent;
  f) treating the precursor mixture at elevated temperature to dry the precursor mixture; and
  g) optionally heating the dried precursor mixture to a temperature in a range of ≥800° C. to ≤1200° C.

4. The method as claimed in any one of claims 1 to 2, wherein the reinforcing fibers are subjected to doping.

5. A method for producing a transparent component part comprising a method as claimed in claim 1 wherein the produced composite material is further processed into a component part.

6. A fiber-reinforced composite material comprising a transparent matrix comprising reinforcing fibers wherein the composite material is obtained by a method as claimed in claim 1.

7. The fiber-reinforced composite material as claimed in claim 6, wherein the reinforcing fibers have a length in a range of ≥5 mm to ≤20 mm.

8. The fiber-reinforced composite material as claimed in claim 6 wherein the reinforcing fibers have a thickness in a range of ≥0.1 μm to ≤2 μm.

9. The fiber-reinforced composite material as claimed in claim 6, wherein the matrix material is selected from the group consisting of glass and plastic.

10. The fiber-reinforced composite material as claimed in claim 6, wherein the reinforcing fibers are electrically conductive.

11. A fiber-reinforced component part, wherein the component part comprises a composite material as claimed in claim 6.

12. The component part as claimed in claim 11, wherein the component part is selected from the group consisting of a transparent microwave-protective glass, transparent microwave-receiving antennas, vehicle panes, touch displays or transparent electrodes.

13. Use of a method as claimed in claim 1 for producing a fiber-reinforced composite material.

14. The method as claimed in claim 1, wherein the reinforcing fibers in the material melt or before being imported into the material melt are treated with a temperature in a range of ≥2100° C.

15. A method for producing a fiber-reinforced transparent composite material, said method comprising the steps of:
  a) providing a material matrix melt; and
  b) producing reinforcing fibers, wherein step b) comprises the steps of:
    b1) providing a mixture with a silicon source and a carbon source, wherein the silicon source and the carbon source are conjointly present in particles of a granular solid;
    b2) treating the mixture provided in step b1) with a temperature in a range of ≥1400° C. to ≤2000° C. to produce reinforcing fibers;
  c) importing the reinforcing fibers into the material melt;
  d) cooling the material melt; and
  e) producing a fiber-reinforced transparent composition material;
  wherein step b2) proceeds in a reactor having a deposition surface whose temperature is reduced relative to at least one further inner reactor surface by an amount in the range of ≥30° C. to ≤200° C.

* * * * *